United States Patent
Kalfon et al.

(10) Patent No.: US 10,674,118 B1
(45) Date of Patent: Jun. 2, 2020

(54) METHOD AND SYSTEM FOR DISCREETLY ACCESSING SECURITY CAMERA SYSTEMS

(71) Applicant: CYBERTOKA Ltd., Tel-Aviv (IL)

(72) Inventors: Micha Kalfon, Ashdod (IL); Sofia Belikovetsky, Petach Tikva (IL); Shimi Gersner, Tel Aviv (IL); Roi Leibovich, Ganei Tikva (IL); Michael Volfman, Tel Aviv (IL); Alon Kantor, Tel Aviv (IL)

(73) Assignee: CYBERTOKA Ltd., Tel-Aviv (IL)

( * ) Notice: Subject to any disclaimer, the term of this patent is extended or adjusted under 35 U.S.C. 154(b) by 0 days.

(21) Appl. No.: 16/400,696

(22) Filed: May 1, 2019

(51) Int. Cl.
*H04N 7/18* (2006.01)

(52) U.S. Cl.
CPC .................... *H04N 7/183* (2013.01)

(58) Field of Classification Search
CPC ...................................... H04N 7/183
See application file for complete search history.

(56) References Cited

U.S. PATENT DOCUMENTS

| | | | |
|---|---|---|---|
| 6,271,752 B1 * | 8/2001 | Vaios | G08B 13/19608 340/525 |
| 6,509,926 B1 * | 1/2003 | Mills | G08B 13/1968 348/143 |
| 9,602,586 B2 * | 3/2017 | Tarricone | H04L 67/10 |
| 10,230,739 B2 * | 3/2019 | Agaian | H04L 63/1408 |
| 2010/0250497 A1 * | 9/2010 | Redlich | F41H 13/00 707/661 |
| 2011/0047554 A1 * | 2/2011 | Lakshmanan | G06F 9/5088 718/105 |
| 2011/0314159 A1 * | 12/2011 | Murphy | H04L 65/4076 709/226 |
| 2016/0196687 A1 * | 7/2016 | Alpert | G06T 17/05 345/419 |
| 2018/0246519 A1 * | 8/2018 | Klische | G05D 1/0246 |
| 2019/0088233 A1 * | 3/2019 | Chew | G09G 5/003 |
| 2019/0110096 A1 * | 4/2019 | Shaw | H04N 21/25866 |

* cited by examiner

*Primary Examiner* — Joseph W Becker
(74) *Attorney, Agent, or Firm* — Mark M. Friedman

(57) ABSTRACT

Systems and methods are provided for modifying transmissions made by security cameras so as to allow access to the surveyed locations without the knowledge of the operator of the cameras.

17 Claims, 5 Drawing Sheets

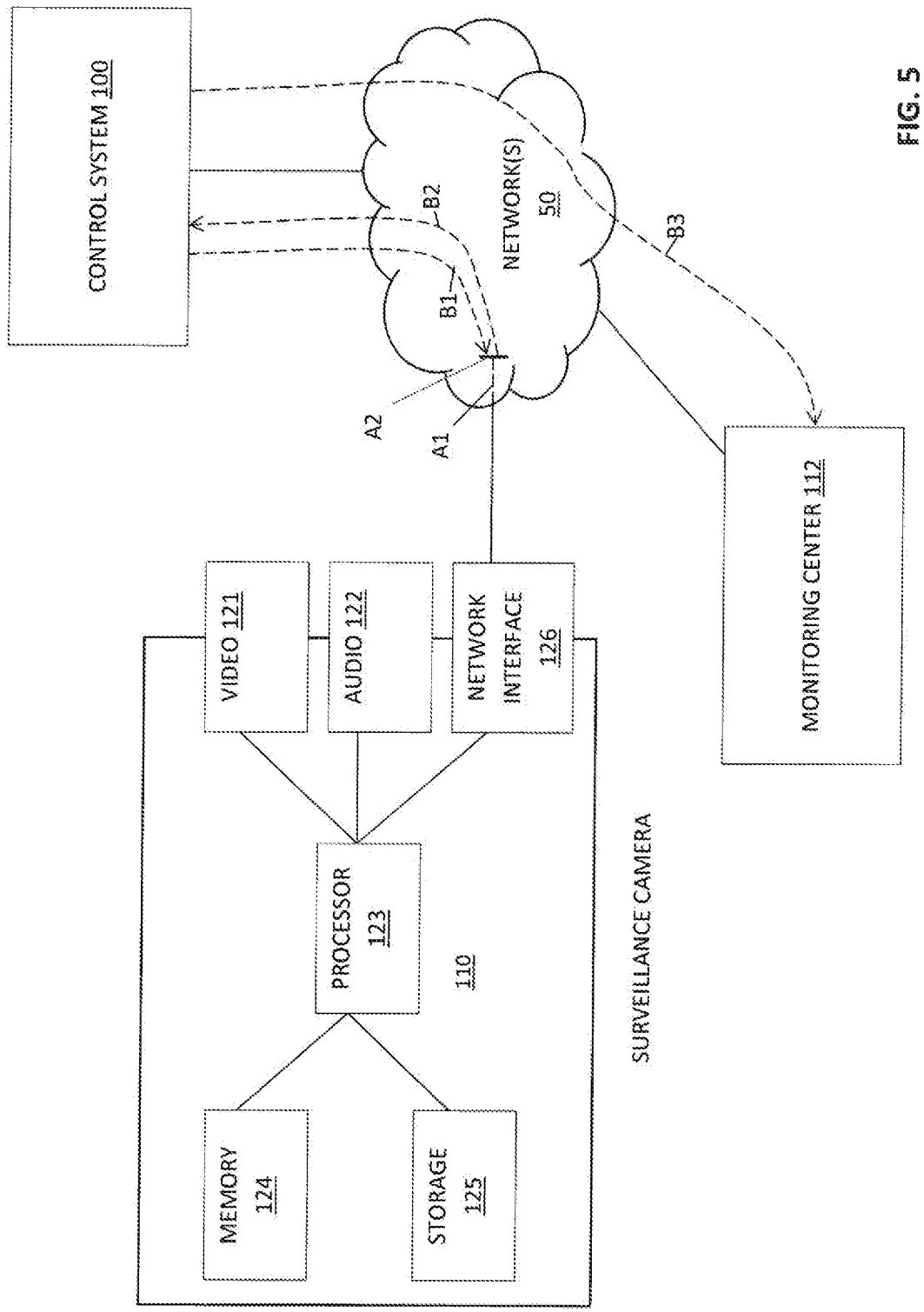

METHOD AND SYSTEM FOR DISCREETLY ACCESSING SECURITY CAMERA SYSTEMS

TECHNICAL FIELD

The present invention is related to security cameras and discreet access to network connected security cameras.

BACKGROUND OF THE INVENTION

Modern day security systems are comprised of cameras that transmit, over a network, data streams to monitoring centers, where the data streams are monitored, stored and analyzed. The prevalence of such cameras in an area makes it difficult to access the areas monitored by the cameras without being detected.

SUMMARY OF THE INVENTION

The present invention relates to methods and systems for allowing the obtaining of access to locations that are monitored by network connected security cameras, for recording video and/or audio streams of a location, without being detected. The cameras are deployed in proximity to the locations they secure. The cameras transmit a stream of data (data stream) comprised of at least a video stream and/or an audio stream to a monitoring center over a network.

Embodiments of the invention are directed to a method for surveillance and/or security. The method comprises: detecting a first data stream being transmitted to an intended first destination; redirecting the first data stream to a second destination different than the intended first destination; and, transmitting a second data stream to the intended destination during at least a portion of the time that the first data stream is redirected.

Optionally, the method is such that the first data stream and the second data stream each include at least one of video data and/or audio data.

Optionally, the method additionally comprises: in response to the interception of the first data stream, opening a connection between a source of the second data stream and the intended destination for the first data stream.

Optionally, the method is such that the source of the second data stream includes the second destination.

Optionally, the method is such that the redirecting includes intercepting the first data stream.

Optionally, the method is such that the second data stream includes a modified first data stream.

Optionally, the method is such that the modified first data stream includes a substantially blank video stream.

Optionally, the method is such that the modified first data stream includes a prerecorded data stream.

Optionally, the method is such that the modified first data stream includes a timestamp indicating a time different from the time when the first data stream was intercepted.

Optionally, the method is such that the modified first data stream includes video data showing environmental conditions when the first data stream was intercepted.

Optionally, the method is such that the environmental conditions include one or more of ambient light conditions and/or weather.

Optionally, the method is such that the detecting and the redirecting are performed in real time.

Optionally, the method is such that the detecting, redirecting and transmitting are such that the connections between a device transmitting the first data stream to the intended first destination are maintained.

Optionally, the method is such that the device includes at least one video capturing device and/or at least one audio capturing device.

Embodiments of the invention are directed to a computer system for surveillance and/or security. The computer system comprises: a non-transitory storage medium for storing computer components; and, a computerized processor for executing the computer components. The computer components comprise: a module for detecting a first data stream being transmitted to an intended first destination; a module for redirecting the first data stream to a second destination different than the intended first destination; and, a module for transmitting a second data stream to the intended destination during at least a portion of the time that the first data stream is redirected.

Optionally, the computer system is such that the first data stream and the second data stream each include at least one of video data and/or audio data.

Optionally, the computer system is such that the second data stream includes a modified first data stream.

Optionally, the computer system is such that the modified first data stream includes at least one of: a substantially blank video stream, and, a prerecorded data stream.

Optionally, the computer system additionally comprises a time stamp module for providing a timestamp to the modified first data stream indicating a time different from the time when the first data stream was intercepted.

Optionally, the computer system additionally comprises: an intercepting module, responsive to the detecting module, for intercepting the first data stream.

Optionally, the computer system is such that the module for transmitting the second data stream, in response to the interception of the first data stream, opens a connection between a source of the second data stream and the intended destination for the first data stream.

Embodiments of the invention are directed to a computer usable non-transitory storage medium having a computer program embodied thereon for causing a suitably programmed system to perform surveillance and/or security, by performing the following steps when such program is executed on the system. The steps comprise: detecting a first data stream being transmitted to an intended first destination; redirecting the first data stream to a second destination different than the intended first destination; and, transmitting a second data stream to the intended destination during at least a portion of the time that the first data stream is redirected.

Optionally, the computer usable non-transitory storage medium is such that the first data stream and the second data stream each include at least one of video data and/or audio data.

Optionally, the computer usable non-transitory storage medium is such that the redirecting includes intercepting the first data stream.

Optionally, the computer usable non-transitory storage medium is such that the second data stream includes a modified first data stream.

Optionally, the computer usable non-transitory storage medium is such that the modified first data stream includes at least one of: a substantially blank video stream, and, a prerecorded data stream.

Optionally, the computer usable non-transitory storage medium is such that the detecting and the redirecting are performed in real time.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Figure 1:
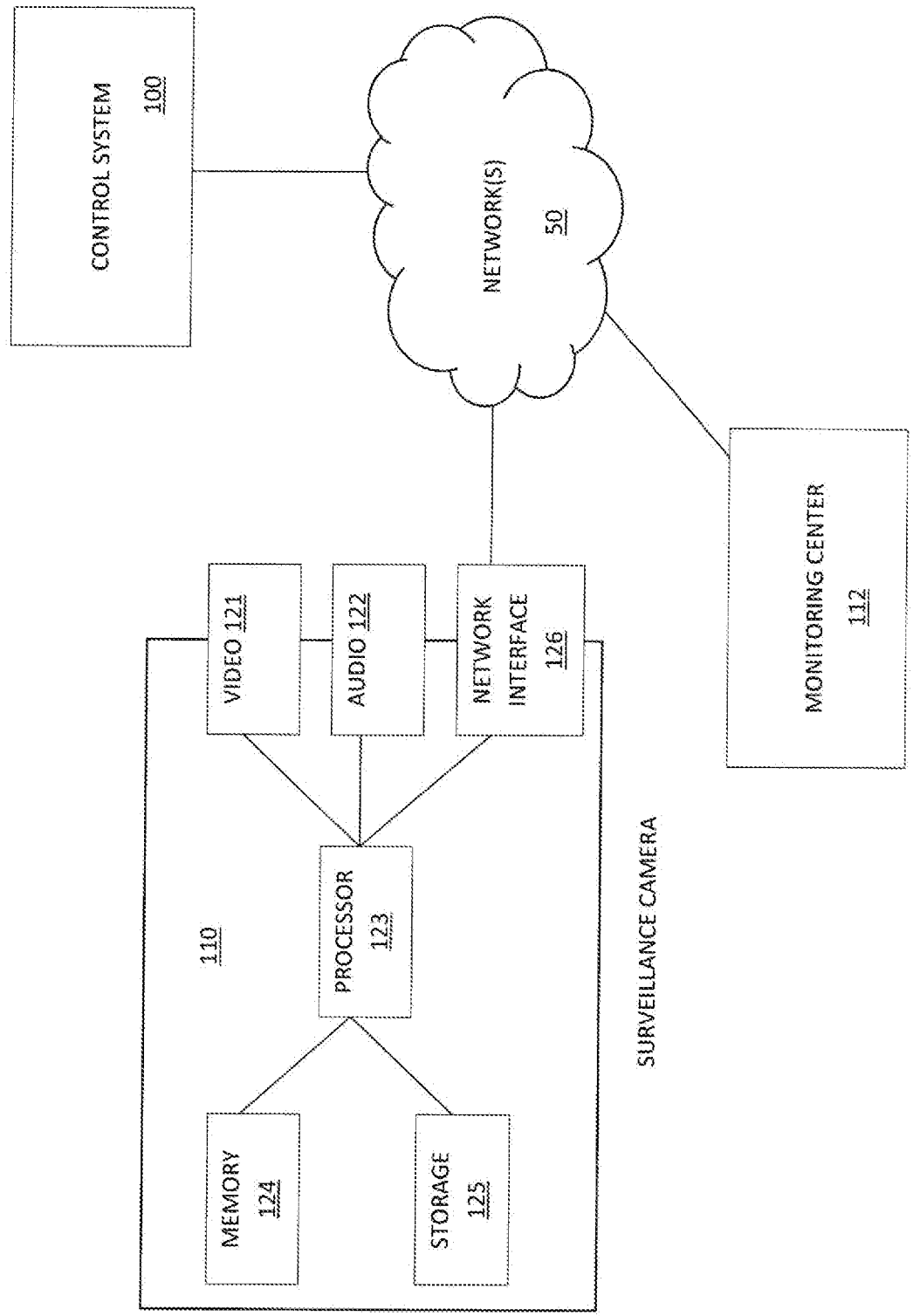
FIG. 1 is a diagram of an exemplary environment for the system in which embodiments of the disclosed subject matter are performed.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

The present invention addresses the need to obtain physical access to environments protected by such security systems without the security systems' operator's knowledge. The system of the invention avoids having to physically access the security camera or system, which would be detected by the camera operators or operators of the monitoring center.

The present invention provides systems and methods for modifying transmissions, for example, in the form of data streams, of video and/or audio, made by one or more security cameras so as to allow access to the surveyed locations without the knowledge of the operator of the cameras.

The present invention provides methods and systems which access the security camera(s) and the video and/or audio stream being sent to the monitoring center, and modifies the video and/or audio stream. The modification is such that the monitoring center receives a modified video and/or audio stream, during at least the time the actual video and/or audio stream is being transmitted (sent) to a destination dictated by the system, which has accessed the video and/or audio stream, which was initially intended for and transmitted to the monitoring center. The methods and systems of the present invention access the initial video and/or audio stream, transmitted from the security camera(s), and intended for the monitoring center, by, for example, physically accessing the security cameras on premise or before they are deployed as well as by exploiting vulnerabilities in the software or hardware used by the camera(s). The accessing of the initial video and/or audio stream, and modification thereof, is performed while maintaining the integrity of the network connections between the security camera(s) and the monitoring center.

FIG. 1 shows an example environment in which the invention is performed. A control system 100, links to a network(s) 50. The control system 100 includes, for example, one or more machines, computers, servers and the like. The control system 100 is, for example, automatically controlled by computers and the like, controlled by an operator, such as a human operator, or combinations thereof. The network(s) 50 are also linked to a security or surveillance camera 110, and a monitoring center 112. The camera 110 is representative of the one or multiple security cameras that send images, data and the like to a monitoring center 112, over the network(s) 50. For example, the control system 100 may be discreetly linked to the security camera 110, the monitoring center 112 and/or the connection therebetween, over which data streams are transmitted, or may be able to access the aforementioned by accessing low level hardware and/or software components thereof.

The network 50, although shown as a single network, may be a combination of networks and/or multiple networks including, for example, cellular networks, local area networks (LAN), such as private or enterprise networks, and/or wide area networks (WAN), such as public networks, including the Internet. "Linked" as used herein, includes both wired and/or wireless links, either direct or indirect, such that the computers, including, servers, components and the like, are in electronic and/or data communications with each other.

The security camera 110 is, for example, a video capturing device. The security camera 110 includes, for example, a video unit 121, including a lens, optical sensors and an image processor, for capturing and/or generating images and image data, such as video, thermal, ultrasonic, ultraviolet (UV) infrared (IR), and the like, for example, as digital images.

There is also an audio unit 122, for example, an audio capturing device. The audio unit 122 includes, for example, of audio sensors, listening devices, and an audio processor, for capturing and/or generating audio and audio data, for example, in digital format.

The video unit 121 and the audio unit 122 are linked to a processor 123. The processor 123 links to the video unit 121 and the audio unit 122 for processing audio/video data synchronously and transmitting a stream of data to the monitoring center 112, for example, in real time via the network(s) 50. In some cases, the processor 123 embeds the data stream with a visible or a hidden timestamp. Such a timestamp, for example, could be visible to a human operator of the monitoring center 112, and the timestamp serves as an indicator of the robustness of the data stream.

The processor 123 also links to the memory 124, for providing processing instructions to the processor 123, and, links to a storage unit 125, for storing instructions, images and audio files, e.g., in digital format, and the like. A network interface 126 links to the processor 123, and handles electronic and data communications between the security camera 110 and the network(s) 50.

Each of the cameras 110, for example, may be equipped with additional sensors such as motion detectors, thermometers, thermostats, temperature sensors, and/or humidity sensors, and the like, and the data could be incorporated into the transmitted data stream by the processor 123. The cameras 110 may, for example, also perform additional automatic analysis on the video and/or audio streams or any other data obtained via the sensors, to augment the transmitted data stream with additional information such as motion detection, facial (face) and body recognition, object recognition, license plate recognition, or the like.

The cameras 110 are linked to the monitoring center 112 via the network(s) 50. The network(s) 50, when wireless, may be implemented using standards such as the IEEE 802.11 standards or using cellular networks or other techniques. The transmission between the camera(s) 110 and the monitoring center 112 may be protected using cryptographic protocols such as Internet Protocol Security (IPsec), a secure network protocol suite that authenticates and encrypts the packets of data sent over an internet protocol network, Transport Layer Security (TLS), and the like.

The monitoring center 112, for example, includes a storage unit (not shown), which stores transmissions received from the networked cameras 110. Additionally, the monitoring center 112 is such that recorded as well as the currently transmitted data streams, including video and audio portions, are viewed and listened to by human or computerized operators using display terminal units. In addition, the monitoring center 112 may perform automatic analysis of the received data transmissions, such as movement detection, face recognition, license plate recognition, and the like using automatic analysis units.

Figure 2:
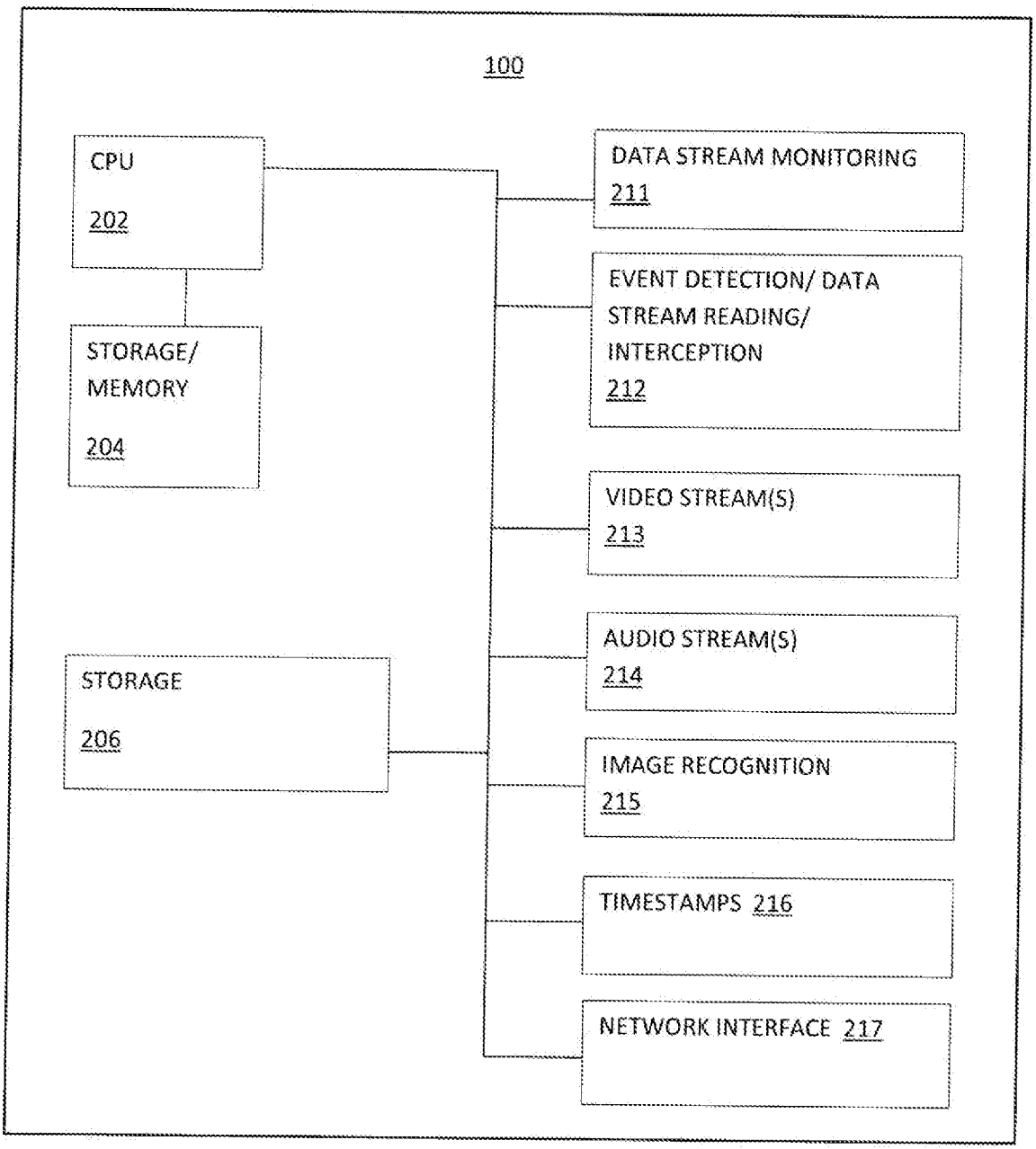
FIG. 2 is a diagram of an example architecture of the classification server of FIG. 1.

Turning also to FIG. 2, there is shown the architecture of an example control system 100, for example a computer for performing the control operations for manipulating the data stream (e.g., video and/or audio) sent from the security camera(s) 110 to the monitoring center 112, i.e., over the network(s) 50. The control system 100 is shown on a single computer, but may be distributed over multiple, computers, servers, machines and the like. The control system 100 includes processors (e.g., a Central Processing Unit (CPU) 202), linked to storage/memory 204. There is also storage media 206, and modules including data stream monitoring 211, event detection/data stream reading/data stream interception 212, video streams 213, audio streams 214, image recognition 215, timestamps 216 and network interface 217. As used herein, a "module", for example, includes a component for storing instructions (e.g., machine readable instructions) for performing a process, and including or associated with processors for executing the instructions. All of the components 202, 204, 206 and 211-217 link to each other either directly or indirectly for electronic and/or data communication therebetween.

The CPU 202 performs the processes (methods) of the present invention. For example, the processors may include x86 Processors from AMD and Intel, Xenon® and Pentium® processors from Intel, as well as any combinations thereof. Additional processors, including hardware processors, storage/memory, modules and storage media may also be part of the system for performing the invention.

Figure 3:
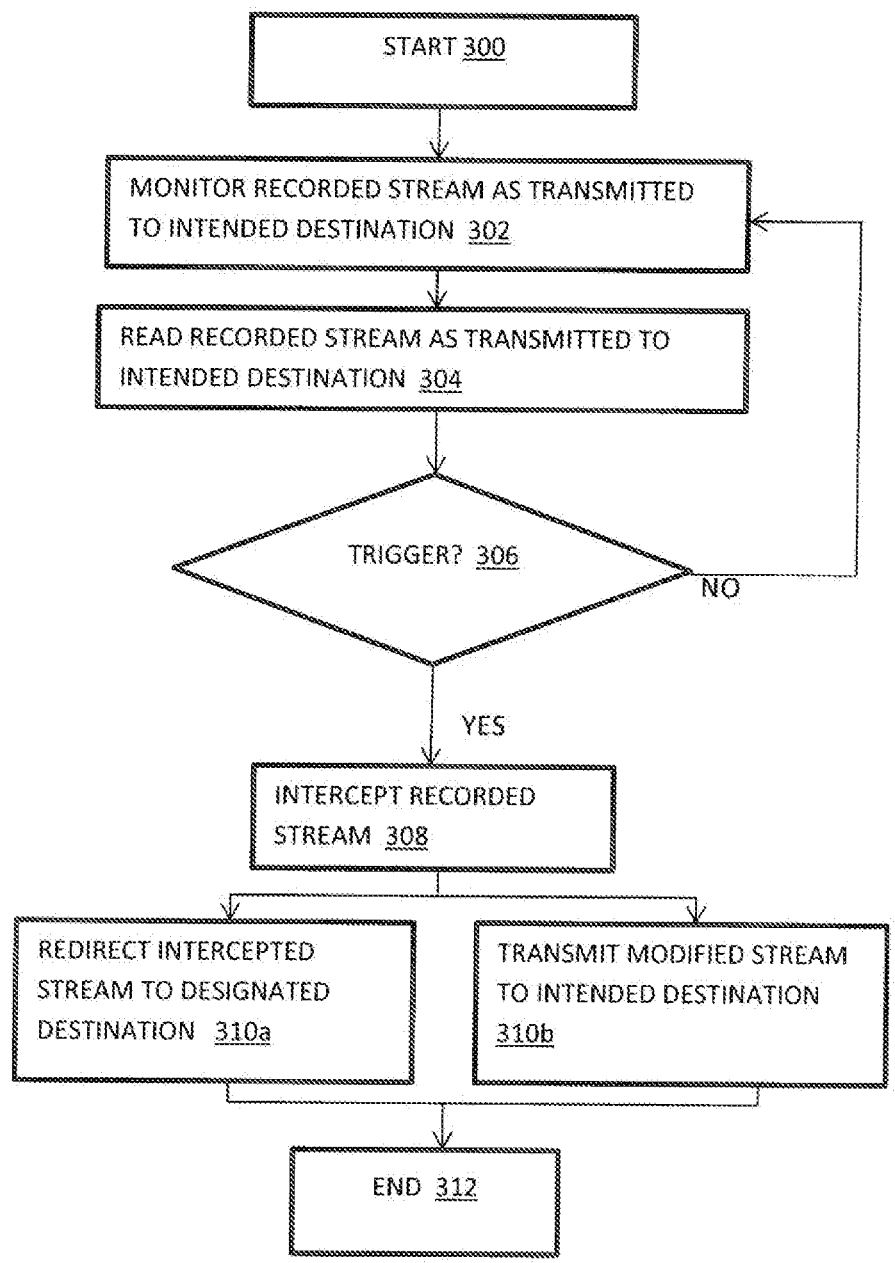
FIG. 3 is a flow diagram of a process in accordance with embodiments of the invention; and, FIGS. 4 and 5 are diagrams showing the invention in operation in the environment detailed in FIG. 1, as applied to the process of FIG. 3.

The storage/memory 204 stores machine-executable instructions executed by the CPU 202 for performing the processes of the invention, for example, those detailed in FIG. 3, which when programmed accordingly into the CPU 202, control the storage media 206 and the modules 211-217, The storage/memory 204, for example, also provides temporary storage for the control system 100.

The storage 206 includes, for example, conventional storage media for storing blank video and audio, separate video and audio, modifiers for video and/or audio streams, video overlays, such as weather conditions, light conditions, letters, numbers, facial features, and the like.

The data monitoring module 211 functions to access the data streams (video and/or audio) between the security camera(s) 110 and the monitoring center 112.

The event detection/data stream reading/interception module 212 detects an event which is to be viewed by the control system 100 from the data stream, and causes interception of the data stream (transmitted from the security camera 110 to the monitoring center 112). The intercepted data stream portion (video and/or audio) is analyzed by the respective video module 213 and/or audio module 214, which selects a modified video and/or audio, respectively, to be transmitted to the monitoring center 112, via the network interface 217. The modified video and/or audio is, for example, one or more of: a substantially blank video stream; a substantially silent audio stream; a distorted video and/or audio stream; a pre-recorded data stream of video and/or audio; an overlay of the transmitted pre-recorded stream with a timestamp (provided by timestamp module 216) which reflects a time different than the time in which the stream was recorded; the pre-recorded data stream modified to reflect the prevailing, or similar, environmental conditions in the location or its vicinity at the time of transmission (the environmental conditions including, for example, lighting conditions, for example, including ambient light, light in the visible and/or invisible light spectrum, weather conditions (for example, including wind, rain, snow, fog, humidity), and magnetic conditions; modified information, such as information transmitted by security cameras such as information about movement detection, license plate recognition or facial recognition, as detected by the image recognition module 215, as augmented into the video and/or audio returned to the monitoring center 112.

Attention is now directed to FIG. 3, which shows a flow diagram detailing a computer-implemented process and sub-processes in accordance with embodiments of the disclosed subject matter. Reference is also made to elements shown in FIGS. 1, 2, 4 and 5. The aforementioned processes and sub-processes are, for example, performed automatically and in real time.

Figure 4:
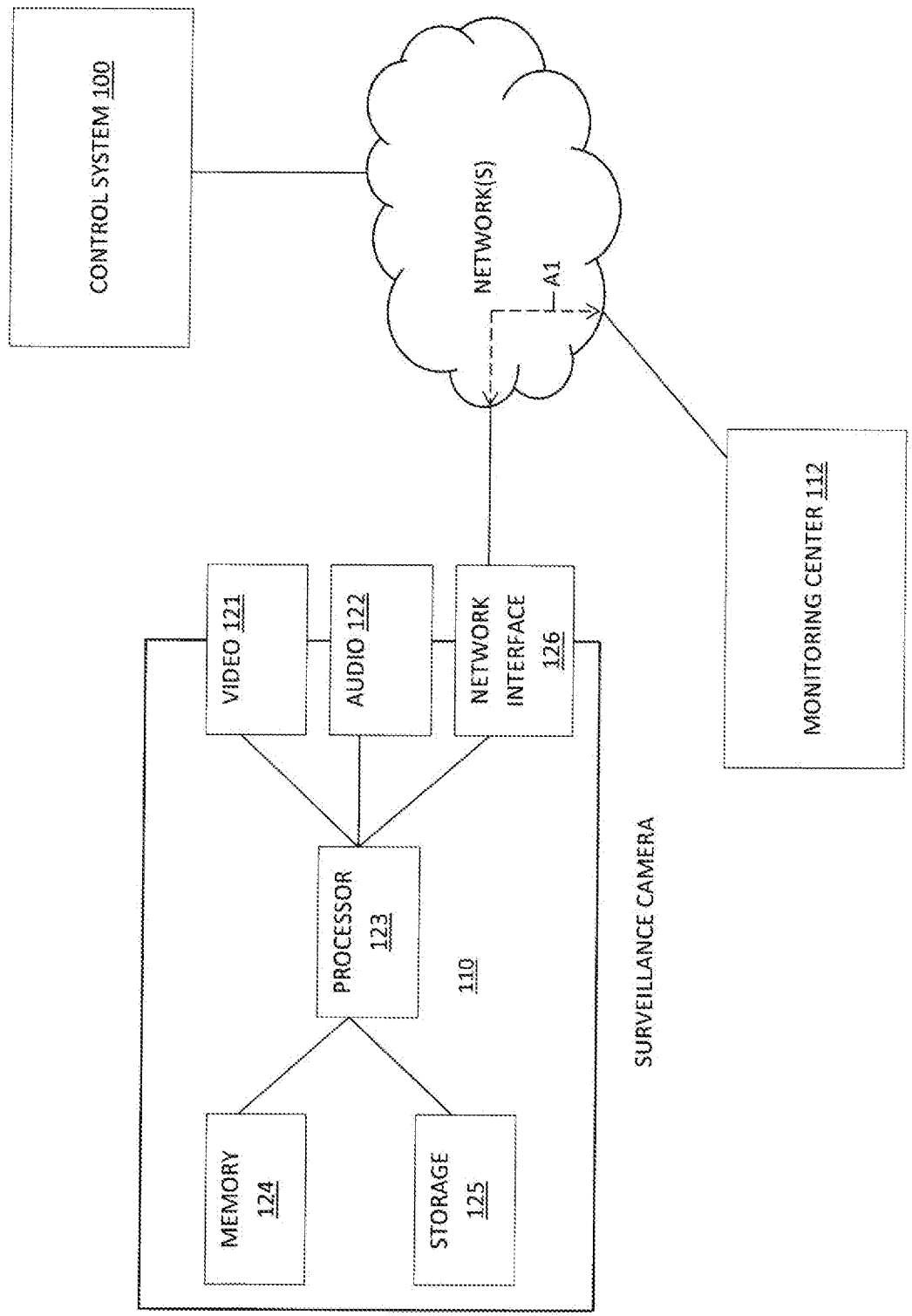

Initially, the process begins at the START block 300. At this block 300, and as shown in FIG. 4, the security cameras 110 transmit data, e.g., video and/or audio, for example, as data streams, to the monitoring center 112, for example, over the network(s) 50. The monitoring center 112 is the intended destination for the transmitted data stream. The transmitted data stream(s) is/are indicated by the broken line double headed arrow A1.

The process moves to block 302, where the transmitted data stream (to the intended destination, e.g., the monitoring center 112) is monitored, by the monitoring module 211.

This monitoring is shown, for example, by broken line arrow B1 of FIG. 5. The monitoring of the data stream is performed, for example, by accessing low level hardware components of one or more of the video camera 110, monitoring center 112, or the connection or pipe (over the network(s) between the camera 110 and the monitoring center 112. Alternately, the control system 100 may be linked to the video camera 110 and/or monitoring center 112, or programmed to have access to the connection (broken line arrow A1 of FIG. 4) between the video camera 110 and the monitoring center 112), for example, discretely, for monitoring by the module 211.

The process moves to block 304, where the recorded data stream, which is being monitored, is read, by the event detection/data stream reading/interception module 212. The reading includes analyzing the recorded data stream (for example, by the video stream module 213 and/or the audio stream module 214) for events which will trigger the interception of the recorded data stream. Triggering events or triggers include, for example, motion detection, facial, human, animal, weather or other environmental conditions, or object (e.g., license plate) recognition (for example, by the image recognition module 215), lighting conditions or changes thereof, including those related to ambient light, or detection of preprogrammed objects or occurrences, or the like. Triggering events are also time based, causing interception of the data stream at preprogrammed times. Triggering can also be command or input based, where the module 212 recognizes input or a command issued by the human or machine operator of the control system 100, for intercepting the transmitted data stream. Based on the instructions in the input or command, the interception may be immediate, upon receiving the input or command, or at a future time.

The process moves to block 306, where the module 212 determines whether there was a triggering event or a trigger, collectively known as a 'trigger". If there was not a trigger, the process returns to block 302, from where it resumes. If there was a trigger at block 306 the process moves to block 308, where the transmitted data stream is intercepted. The interception is shown by the line A2. From block 308, the process moves to block 310a and block 310b, where two separate events occur, typically contemporaneously, and may occur simultaneously, or in any order. The interception immediately results in the data stream no longer being transmitted from the security cameras 110 to the monitoring center 112.

At block 310a, the intercepted data stream, unmodified, and for example, in real time, immediately upon interception, is redirected to the control system 100, or other destination, for example, over the network(s) 50, as designated by the control system 100, or entity (human or machine) associated therewith. Alternately, the other destination may be a component directly linked to the control system 100. The redirection of the intercepted data stream is shown by the broken line arrow B2 of FIG. 5. The redirection continues for as long as necessary, either operator controlled or preprogrammed into the CPU 202.

At block 310b, the read data stream, video and/or audio portions, are then modified, by the respective video 213 and audio 214 modules, with respective data streams, or augmented with data from the storage 206. The modified video and/or audio is, for example, one or more of: a substantially blank video stream; a substantially silent audio stream; a distorted video and/or audio stream; a pre-recorded video and/or audio stream; an overlay of the transmitted pre-recorded stream with a timestamp (provided by timestamp module 216) which reflects a time different than the time in which the stream was recorded; the pre-recorded data stream modified to reflect the prevailing, or similar, environmental conditions in the location or its vicinity at the time of transmission (the environmental conditions including, for example, lighting conditions for example, including ambient light, light in the visible and/or invisible light spectrum, weather conditions and other environmental conditions (for example, including wind, rain, snow, fog, humidity)), and magnetic conditions; modified information, such as information transmitted by security cameras 110 such as information about movement detection, license plate recognition, facial, or other object or event recognition, as detected by the image recognition module 215, as augmented into the video and/or audio stream.

Continuing in block 310b, the modified data stream, including video and/or audio portions, is returned to the intended destination, i.e., the monitoring center 112, as shown by the broken line arrow B3. Here, the control system 100 opens a connection or "pipe" over the network(s) 50 for the modified data stream to be transmitted from the control system 100 to the monitoring center 112. The connection or "pipe" is opened, for example, automatically, in response to the data stream from the security camera 110 being intercepted (at block 308). The modified data stream is transmitted to the monitoring center 112, for as long as the actual data stream, recorded and intercepted from the security camera 110, needs to be read, or is being read, by the module 212 of the control system 100.

From each of blocks 310a and 310b, the process moves to block 312, where it ends. With the processes of blocks 310a and 310b complete, the end block 312 is, for example, such that the interception ends. As a result, the connection for the data stream between the camera 110 and the monitoring center 112 resumes or is otherwise reopened, and connections between the camera 110 and the control system 100 (which facilitated the interception and redirection of the data stream from the security camera 110) are closed. The connection between the control system 100 and the monitoring center 112 is also closed. The aforementioned resumed and closed connections are, for example, 1) made contemporaneous in time, 2) made automatically, and 3) are performed in real time. The processing of the aforementioned contemporaneous connections, is performed, for example, while the integrity of the network connections between the security camera(s) 110 and the monitoring center 112, is maintained, without the connection between security camera(s) 110 and the monitoring center 112 broken or otherwise interrupted.

As one cycle has been shown for the process in blocks 300-312, the cycle may be repeated for as long as desired. The process may be performed temporarily or on a continuous basis.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable non-transitory storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for surveillance comprising:
   detecting a triggering event including at least one of: facial motion detection, human motion detection, animal motion detection, weather conditions, environmental conditions, or object recognition, lighting conditions, changes in lighting conditions, magnetic conditions, detection of preprogrammed objects or occurrences, activation of a redirection at predetermined times, commands to cause redirection immediately, and, commands to cause redirection on a delay;
   responding to the detected triggering event including, detecting a first data stream being transmitted to an intended first destination;
   intercepting the first data stream;
   redirecting the intercepted first data stream to a second destination different than the intended first destination;
   transmitting a second data stream in replacement of the first data stream, to the intended first destination during at least a portion of the time that the first data stream is redirected, the second data stream including at least one of: a modified first data stream, a blank video stream, a prerecorded data stream, a silent audio stream, a distorted video and/or audio stream, and, a pre-recorded video and/or audio stream; and,
   providing a timestamp to the second data stream indicating a time different from the time when the first data stream was intercepted.

2. The method of claim 1, wherein the first data stream and the second data stream each include at least one of video data and/or audio data.

3. The method of claim 1, additionally comprising: in response to the interception of the first data stream, opening a connection between a source of the second data stream and the intended destination for the first data stream.

4. The method of claim 3, wherein the source of the second data stream includes the second destination.

5. The method of claim 1, wherein the modified first data stream includes video data showing environmental conditions when the first data stream was intercepted.

6. The method of claim 5, wherein the environmental conditions include one or more of ambient light conditions and/or weather.

7. The method of claim 1, wherein the detecting, intercepting, and the redirecting are performed in real time.

8. The method of claim 1, wherein the detecting, intercepting, redirecting and transmitting are such that the connections between a device transmitting the first data stream to the intended first destination are maintained.

9. The method of claim 8, wherein the device includes at least one video capturing device and/or at least one audio capturing device.

10. The method of claim 1, wherein the second data stream includes a modified first data stream.

11. A computer system for surveillance, comprising:
   a non-transitory storage medium for storing computer components; and,
   a computerized processor for executing the computer components comprising:
      a module for detecting a triggering event including at least one of: facial motion detection, human motion detection, animal motion detection, weather conditions, environmental conditions, or object recognition, lighting conditions, changes in lighting conditions, magnetic conditions, detection of preprogrammed objects or occurrences, activation of a redirection at predetermined times, commands to cause redirection immediately, and, commands to cause redirection on a delay;
      a module for responding to the detected triggering event including, detecting a first data stream being transmitted to an intended first destination;
      a module for intercepting the first data stream;
      a module for redirecting the intercepted first data stream to a second destination different than the intended first destination;
      a module for transmitting a second data stream in replacement of the first data stream, to the intended first destination during at least a portion of the time that the first data stream is redirected, the second data stream including at least one of: a modified first data stream, a blank video stream, a prerecorded data stream, a silent audio stream, a distorted video and/or audio stream, and, a pre-recorded video and/or audio stream; and
      a module for providing a timestamp to the second data stream indicating a time different from the time when the first data stream was intercepted.

12. The computer system of claim 11, wherein the first data stream and the second data stream each include at least one of video data and/or audio data.

13. The computer system of claim 11, wherein the module for intercepting the first data stream is responsive to the detecting of the first data stream.

14. The computer system of claim 13, wherein the module for transmitting the second data stream, in response to the interception of the first data stream, opens a connection between a source of the second data stream and the intended destination for the first data stream.

15. A computer usable non-transitory storage medium having a computer program embodied thereon for causing a suitably programmed system to perform surveillance, by performing the following steps when such program is executed on the system, the steps comprising:
   detecting a triggering event including at least one of: facial motion detection, human motion detection, animal motion detection, weather conditions, environmental conditions, or object recognition, lighting conditions, changes in lighting conditions, magnetic conditions, detection of preprogrammed objects or occurrences, activation of a redirection at predetermined times, commands to cause redirection immediately, and, commands to cause redirection on a delay;

responding to the detected triggering event including, detecting a first data stream being transmitted to an intended first destination;

intercepting the first data stream;

redirecting the intercepted first data stream to a second destination different than the intended first destination;

transmitting a second data stream in replacement of the first data stream, to the intended first destination during at least a portion of the time that the first data stream is redirected, the second data stream including at least one of: a modified first data stream, a blank video stream, a prerecorded data stream, a silent audio stream, a distorted video and/or audio stream, and, a pre-recorded video and/or audio stream; and, providing a timestamp to the second data stream indicating a time different from the time when the first data stream was intercepted, transmitting a second data stream in replacement of the first data stream, to the intended first destination during at least a portion of the time that the first data stream is redirected, the second data stream including at least one of: a modified first data stream, a blank video stream, a prerecorded data stream, a silent audio stream, a distorted video and/or audio stream, and, a pre-recorded video and/or audio stream; and, providing a timestamp to the second data stream indicating a time different from the time when the first data stream was intercepted.

16. The computer usable non-transitory storage medium of claim 15, wherein the first data stream and the second data stream each include at least one of video data and/or audio data.

17. The computer usable non-transitory storage medium of claim 15, wherein the detecting, intercepting, and the redirecting are performed in real time.

* * * * *